INVENTOR.
ROMUALD ANTHONY

July 1, 1969 R. ANTHONY 3,453,043
IMAGE ROTATING DEVICE
Filed Feb. 17, 1967 Sheet 2 of 2
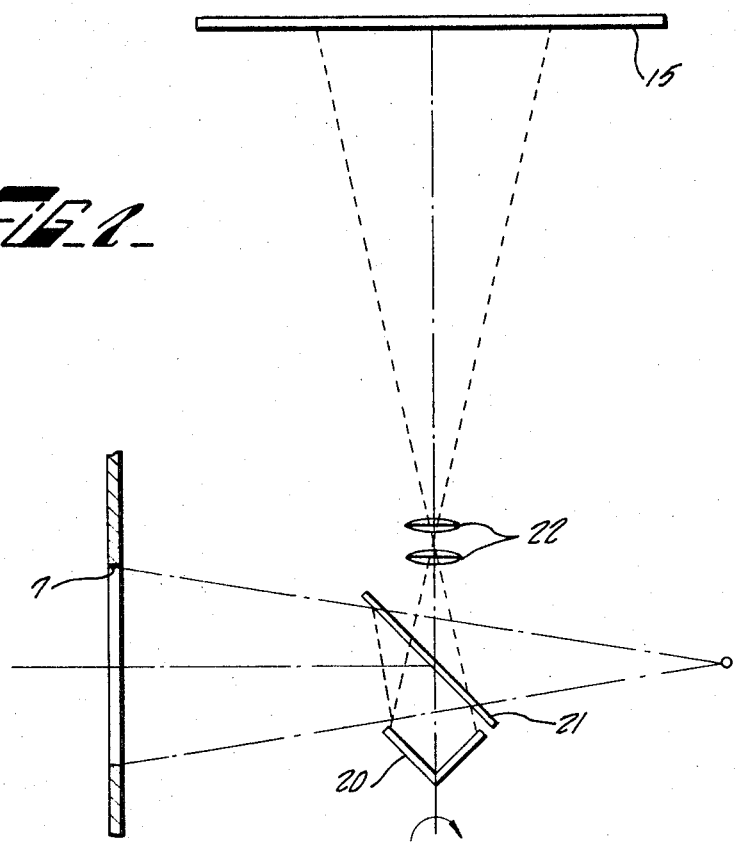
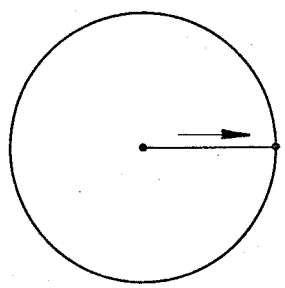
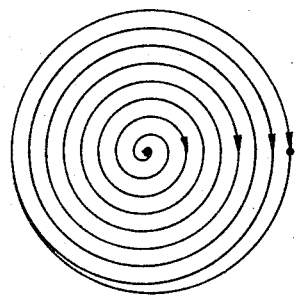
INVENTOR.
ROMUALD ANTHONY
BY
ATTORNEYS

United States Patent Office

3,453,043
Patented July 1, 1969

3,453,043
IMAGE ROTATING DEVICE
Romuald Anthony, Beverly Hills, Calif., assignor to FMA, Inc., Los Angeles, Calif., a corporation of California
Filed Feb. 17, 1967, Ser. No. 616,831
Int. Cl. G03b 21/14
U.S. Cl. 353—69          12 Claims

ABSTRACT OF THE DISCLOSURE

A beam splitter located in the path of a beam of light, a right-angle, retroreflective roof reflector located to intercept part of the light beam incident on the beam splitter and to return this part to the beam splitter, and a lens located in the path of the part of the beam reflected from the roof reflector. The roof reflector is mounted to rotate about an axis perpendicular to the line of intersection of the surfaces forming the right-angle roof. In the preferred embodiment, the roof reflector is located substantially at the aperture stop position of the lens and the lens comprises one-half of a symmetrical lens system. In another embodiment, the reflector is located at a point in the path of the beam of light before the lens. An optical system for producing a spiral scan with an image rotating device is also disclosed.

Background of the invention

This invention relates to optical systems and, more particularly to an image rotating device.

The field angle that an optical device is capable of accommodating is an important consideration in the design of optical systems. Many optical systems must be capable of accommodating a large field angle for one reason or another. In an image projection system, for example, the field angle largely determines the image size that it is possible to attain in a given projecting distance.

Various applications in the field of optics require the orientation of an image to be rotatable. In film projectors, it is sometimes desirable to view an image in an orientation different from the orientation of the image recorded on film. Since the film is usually stored on reels and tarnsported past a light source by guide rollers or sprockets, it is generally more convenient to employ an image rotating device in the path of the projected image to establish the desired orientation rather than to rotate the film itself.

A Dove or Pechan prism is frequently used to rotate an image. Light passing through the prism in one plane is inverted, while light passing through the prism in the perpendicular plane is transmitted in a normal manner. As the prism is rotated through a given angle about an axis parallel to the direction of propagation of the light, the image transmitted through the prism rotates through twice the given angle. The application of these prisms as an image rotator is, however, limited in that they are only capable of rotating a narrow field and a small cone angle.

Other image rotating systems have been devised to overcome the limitations of these prisms. Typical of such systems are the well-known K-mirror arrangement and the system disclosed in C. K. Shumway, Jr., Patent 3,030,857, issued Apr. 28, 1962. For the most part, arrangements are involved in which an image is reflected from an extended array of mirrors that are designed to rotate in mass to effect rotation of the image. Attempts to employ such an arrangement in an optical system capable of accommodating a wide field angle result in equipment that is bulky and difficult to operate. Until the present, it has not been feasible to rotate an image having a field angle much in excess of 15 degrees by use of image rotating devices of reasonable size.

Summary of the invention

According to the invention, an image rotating device is contemplated that employs a right-angle, retroreflective roof reflector capable of rotating about an axis perpendicular to the line of intersection of the surfaces forming the right-angle roof. A beam splitter is located in the path of an image projecting beam of light, and the roof reflector is located to intercept part of the light beam incident on the beam splitter, returning this part to the beam splitter. A lens is located in the path of the part of the light beam returned by the roof reflector. Although the lens can be located virtually anywhere in the path of the light beam, even in front of the beam splitter, it is particularly advantageous to arrange the lens so the roof reflector is substantially at its aperture stop position. Thus, image rotation takes place at a point in the optical system at which the cross section of the beam conveying the image is normally a minimum value. With the roof reflector located substantially at the aperture stop position of the lens, the beam of light conveying the image passes through the lens twice, once before it impinges upon the reflector and once after it is returned thereby. As a result, only one-half of a symmetrical lens system is required to constitute a complete equivalent symmetrical lens system. This reduces the number of parts required and contributes to the compactness of the image rotating device.

Application of these principles in an image rotating device permits rotation of images having field angles of 40 degrees and larger in a compact piece of equipment.

According to a feature of the invention, a spiral beam scan is produced by applying a beam of light moving back and forth in a straight-line excursion to an image rotating device, preferably of the type employing the principles described above. The image rotating device revolves at a constant speed which bears a predetermined relationship to the frequency of the beam excursions.

Brief description of the drawings

These and other features of the invention are considered further in the following detailed description taken in conjunction with the drawings, in which:

FIG. 2 is a schematic diagram of a modified embodiment of the system of FIG. 1;

FIGS. 4A and 4B are sketches depicting the path of the beam scan of FIG. 3 at a flying spot scanner and at a projection screen, respectively.

Description of the preferred embodiments

Figure 1:
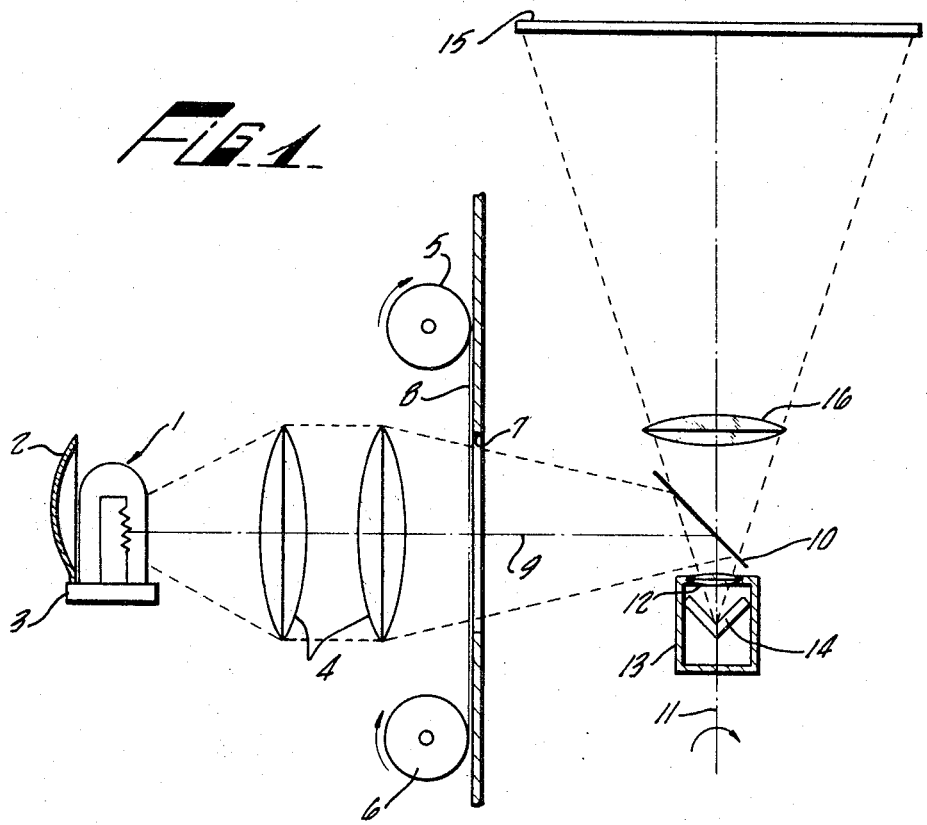
FIG. 1 is a schematic diagram of an optical system employing the principles of the invention.

In FIG. 1 an image projection system is shown. A lamp 1 and a reflector 2 are mounted on a base 3. Reflector 2 directs the light from lamp 1 toward a condenser arrangement 4 that collects the light and forms a converging beam. Photographic film 8 having images to be projected extends between a storage reel 5 and a takeup reel 6. A film gate 7 is aligned with the beam of light developed by condenser 4. Light from condenser 4 passes through film 8 and travels along an axis 9 toward a beam splitter 10 which is oriented to reflect part of the energy from the incident light along an axis 11 oriented at an angle of 90 degrees to axis 9. The angle between axes 9 and 11 is a matter of convenience and can be controlled by changing the orientation of beam splitter 10. Beam splitter 10 could comprise a thin membrane or pellicle having a partially reflective coating on its surface, a partially reflective mirror, a cube, or any other conventional beam splitting device. A lens 12 comprising one-half of a symmetrical lens system is supported by a housing 13. A right-angle retroreflective roof reflector which could, for example, comprise two abutting mirrors forming a right angle or a Porro prism, is located within housing 13 substantially at the aperture stop position of lens 12. In other words, the line of intersection between the right-angle surfaces or roof reflector 14 is perpendicular to axis 11 and is preferably placed as close as is physically possible to lie in the plane of the aperture stop position of lens 12. Housing 13 is supported by means not shown to rotate about axis 11, i.e., about an axis perpendicular to the line of intersection of the right-angle surfaces of roof reflector 14. Light energy reflected from beam splitter 10 passes through lens 12 in one direction and is reflected back from roof reflector 14 in a direction opposite its initial direction. In being reflected from roof reflector 14, the image in one plane becomes inverted, while the image in the perpendicular plane is reflected without inversion. Thus, the term "retroreflective" as employed in this application in describing the function of roof reflector 14 refers to the optical axis (axis 11) or the direction of propagation of the light beam rather than the entire image. As housing 13 rotates through a given angle, the image of the beam reflected from roof reflector 14 rotates through twice the given angle. The beam reflected from roof reflector 14 passes through lens 12 in the other direction and impinges upon beam splitter 10. Due to the return of the beam by roof reflector 14, lens 12 is equivalent to a complete symmetrical lens system. Part of the beam impinging upon beam splitter 10 is transmitted along axis 11 toward a projection screen 15. This part of the beam represents the utilized light energy.

Since roof reflector 14 is located substantially at the aperture stop position of lens 12, the light beam is rotated at a point where its cross section is normally a minimum value. As a result, a large field angle can be accommodated by an image rotator having compact physical size. By way of example, a field angle as large as 40 degrees can be accommodated with ease. The fact that only one-half of a symmetrical lens system must be provided since the beam is, so to speak, folded back on itself contributes to the compactness of the image rotating device.

A correcting lens 16 is interposed between screen 15 and beam splitter 10 to compensate for various distorting effects arising in the system. The nature of the corrections introduced by lens 16 depends in large measure on the particular type of beam splitter selected and the characteristics of lens 12 as well as the types and extent of distortion the system requirements will allow.

In FIG. 2 a modification of the optical system shown in FIG. 1 is depicted. In this embodiment, a right-angle retroreflective roof reflector 20, a beam splitter 21, and a complete lens system 22 are involved. Roof reflector 20 is not located at the aperture stop position of lens system 22, but is located at a point in the utilized beam path before passage through lens system 22. As a result, the beam at the point of rotation is normally small although not a minimum as in the case of the embodiment of FIG. 1. Other relative locations of roof reflector 20, beam splitter 21, and lens system 22 in the utilized beam path are also possible. In some applications, the invention can also be put to advantageous use by locating roof reflector 20 at a point in the utilized beam path after the passage through lens system 22.

Figure 3:
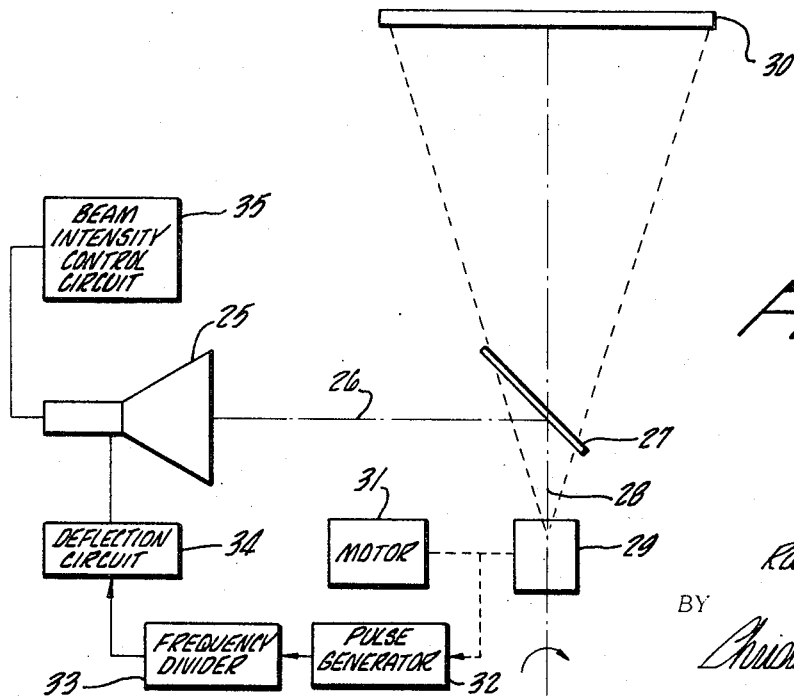
FIG. 3 is a schematic diagram partially in block form of an arrangement for producing a spiral beam scan.

In FIG. 3, an arrangement is disclosed for producing a spiral beam scan. A flying spot scanner 25 produces a concentrated beam of light that is directed along an axis 26. A beam splitter 27 is oriented at an angle of 45 degrees to axis 26. Thus, part of the energy of the beam emanating from flying spot scanner 25 is directed along a perpendicular extension 28. In the path of extension 28 is an image rotating device 29, which is most advantageously constructed as described in connection with FIG. 1. but which could be any image rotating device. The rotated image returns to beam splitter 27 from device 29. Part of the light energy of this beam continues along extension 28 to a screen 30. Device 29 is continuously rotated at a constant speed by a motor 31. A pulse generator 32 is adapted to produce a pulse each time device 29 turns one revolution. This could be accomplished by a disc rotating with device 29, a source of light on one side of the disc, and a photoelectric cell aligned with the source on the other side of the disc. A pulse of light would be coupled from the source to the photoelectric cell through a slot in the disc once each revolution of the disc. The output of pulse generator 32 is coupled to a frequency divider 33 that reduces the number and frequency of pulses. The pulses from frequency divider 33 are applied as a synchronizing signal to a deflection circuit 34 of flying spot scanner 25. A beam intensity control circuit 35, the nature of which depends upon the particular application of the spiral beam scan, is connected to the cathode of flying spot scanner 25.

In operation, flying spot scanner 25 is controlled so its beam continually traverses the same straight-line path from the center of the tube to one edge, i.e., the beam is deflected only in one coordinate. FIG. 4A, which represents the face of flying spot scanner 25, depicts the path of the beam. As the beam of flying spot scanner 25 sweeps from the center to the edge of the face, image rotating device 29 turns, thus forming a spiral scan on screen 30, the face of which is represented by FIG. 4B. In any case, the sweep of the beam of flying spot scanner 25 bears a predetermined relationship to the frequency of rotation of device 29. In the specific embodiment shown, it is synchronized by pulse generator 32 and frequency divider 33 to a subfrequency of the frequency of rotation of device 29. The number of revolutions in the spiral scan depends upon the amount of frequency division of the pulses produced by pulse generator 32. The image emanating from device 29 rotates at twice the frequency of device 29 itself. The arrangement of FIG. 3 could be employed to modulate the beam of flying spot scanner 25 with an image already on screen 30 or to produce an image on screen 30 by information introduced to beam intensity control circuit 35.

If only part of a spiral is to be formed, frequency divider 33 is eliminated and deflection circuit 34 is controlled by pulse generator 32 to produce the desired scan.

What is claimed is:

1. An image rotating device comprising: a beam splitter; a right-angle retroreflective roof reflector located to intercept part of a beam incident on the beam splitter, the roof reflector being rotatable about an axis perpendicular to the line of intersection of the right-angle surfaces of the roof reflector; and a lens located in the path of the part of a beam intercepted by the roof reflector.

2. The image rotating device of claim 1, in which the roof reflector is located substantially at the aperture stop position of the lens and the lens comprises one-half of a substantially symmetrical lens system.

3. The image rotating device of claim 2, in which the lens and the roof reflector are enclosed in a common housing that is mounted to rotate about an axis perpendicular to the line of intersection of the right-angle surfaces of the roof reflector.

4. The image rotating device of claim 1, in which the lens and the roof reflector are enclosed in a common housing that is mounted to rotate about an axis perpendicular to the line of intersection of the right-angle surfaces of the roof reflector.

5. The image rotating device of claim 1, in which a correcting lens is provided in the path of the light beam to compensate for distortion.

6. The image rotating device of claim 1, in which the beam splitter includes a partially reflective surface that transmits part of the incident energy and reflects part of the incident energy and the axis of rotation of the roof reflector forms a 45-degree angle with the surface of the beam splitter.

7. The image rotating device of claim 1, in which the line of intersection of the right-angle surfaces of the roof reflector lies substantially in the plane of the aperture stop position of the lens.

8. An optical system comprising: means for forming a beam of light; means for splitting the beam into parts traveling in different directions; means for reflecting one of the parts of the beam back in a direction opposite its initial direction such that the beam is inverted in one plane and is reflected without inversion in the perpendicular plane, the reflecting means being rotatable about an axis parallel to the initial direction of the one part; and a lens for forming an image from the beam of light.

9. The optical system of claim 8, in which the reflecting means is located substantially at the aperture stop position of the lens and the lens comprises one-half of a substantially symmetrical lens system.

10. The optical system of claim 8, in which the beam of light converges along at least part of its path and the reflecting means is located at a point along the converging part of the beam path.

11. The optical system of claim 8, in which the reflecting means is a right-angle retroreflective roof reflector.

12. The optical system of claim 8, in which the means for forming a beam of light comprises: an incandescent lamp; a film having an image on it; a film gate having an aperture aligned with the film; a condenser system for collecting the light energy from the lamp on the surface of the film at the operture of the gate; and a projection screen in the path of the beam reflected from the reflecting means.

References Cited
UNITED STATES PATENTS

| | | | |
|---|---|---|---|
| 784,852 | 3/1905 | Goerz | 350—203 |
| 2,257,551 | 9/1941 | Griffin et al. | 88—24 |
| 2,307,202 | 1/1943 | Eddy | 88—24 |

NORTON ANSHER, *Primary Examiner.*

WAYNE A. SIVERTSON, *Assistant Examiner.*

U.S. Cl. X.R.

350—202; 353—98

PO-1050
(5/69)

UNITED STATES PATENT OFFICE
CERTIFICATE OF CORRECTION

Patent No. 3,453,043    Dated    July 1, 1969

Inventor(s) Romuald Anthony

It is certified that error appears in the above-identified patent and that said Letters Patent are hereby corrected as shown below:

In the specification: column 1, line 46, "tarnsported" should be --transported--; line 47, the period should be a comma. Column 3, line 9, "or" should be --of--.

In the claims: claim 12, column 6, line 8, "operture" should be --aperture--.

SIGNED AND
SEALED
MAY 5 1970

(SEAL)
Attest:

Edward M. Fletcher, Jr.
Attesting Officer

WILLIAM E. SCHUYLER, JR.,
Commissioner of Patents